UNITED STATES PATENT OFFICE.

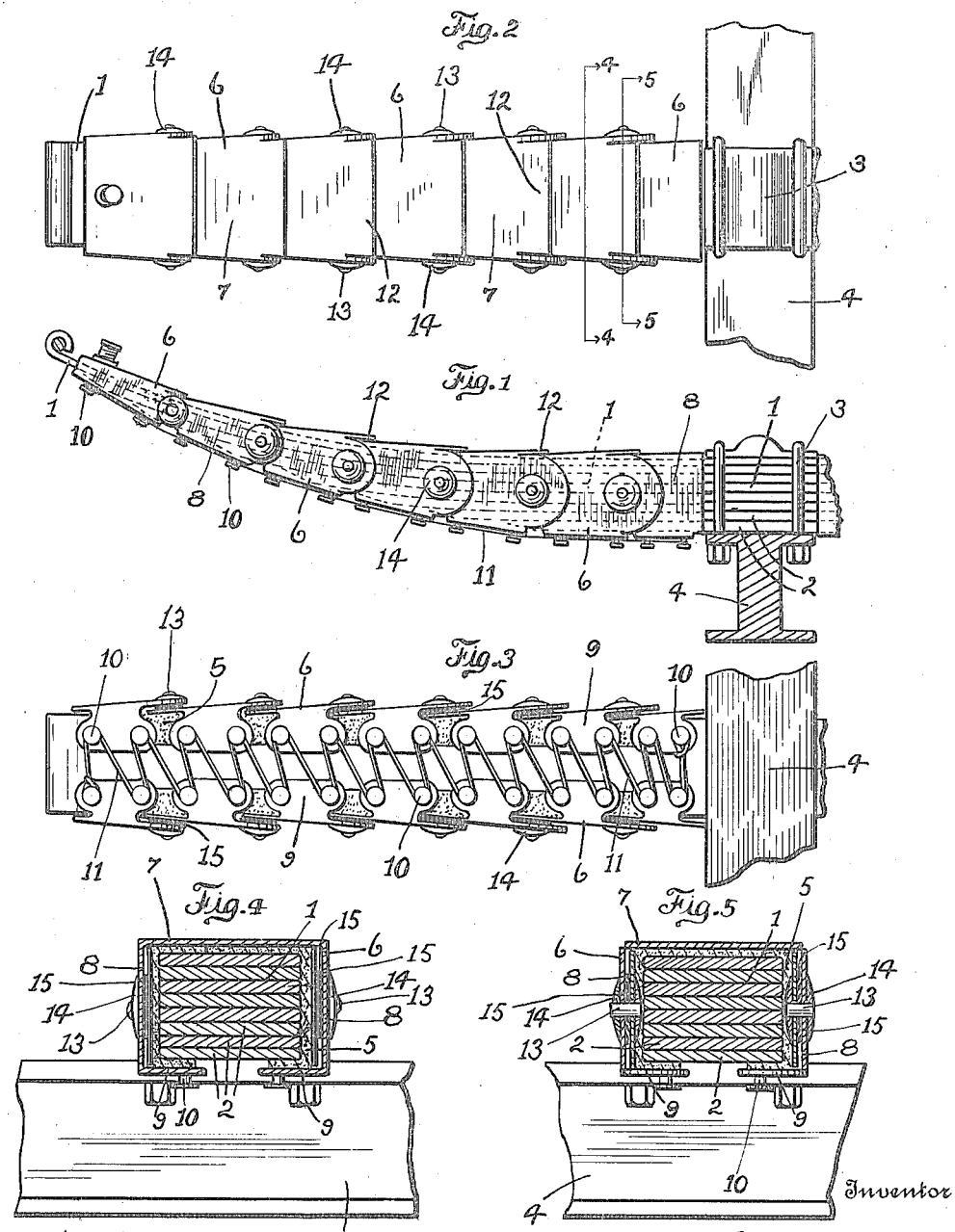

THEODORE LINDENBERG, OF GRANDVIEW HEIGHTS, OHIO.

SPRING ATTACHMENT.

1,207,307.
Specification of Letters Patent.
Patented Dec. 5, 1916.

Application filed August 16, 1915. Serial No. 45,808.

*To all whom it may concern:*

Be it known that I, THEODORE LINDENBERG, a citizen of the United States, residing at Grandview Heights, in the county of Franklin and State of Ohio, have invented certain new and useful Improvements in Spring Attachments, of which the following is a specification.

My invention relates to spring attachments designed to form a lubricating device for such springs, in order that the leaves forming the same may be kept in such condition that they are permitted a relative movement under flexing action as is necessary to perfect resiliency.

One of the objects of my invention, therefore, resides in an improved device which may be very readily applied to springs now in use principally upon automobiles to keep these springs in a well oiled state. This portion of my invention follows as an improvement over the structure shown in my copending application, Serial Number 30237, filed May 24, 1915.

A further object of my invention resides in combining with the spring lubricating arrangement, a structure to hold the same in its applied position, this means comprising a shock absorber structure to lessen the amount of rebound of a spring after it has been suddenly flexed or, in other words, to let this rebound be accomplished somewhat slowly, in order to reduce its severity.

Still another object of my invention resides in forming a plurality of plate members to such shape that they will hold a layer of felt or some similar absorbent material in its applied position in coöperative relation with the leaves of the spring and pivotally connecting these members together in such manner that a friction shock absorber structure is produced.

The preferred embodiment of my present invention is shown in the accompanying drawings, in which similar characters of reference designate corresponding parts, and in which:

Figure 1 is a view in side elevation of a portion of a semielliptic spring with my invention applied thereto, Fig. 2 is a top plan view of the structure shown in Fig. 1, Fig. 3 is a bottom view of the structure shown in Fig. 1, Fig. 4 is a section taken on line 4—4 of Fig. 1, and, Fig. 5 is a section taken on line 5—5 of Fig. 1.

In these drawings, I have shown a form of leaf spring at 1, this leaf spring being composed of a plurality of individual leaves 2 all held together by a suitable type of clevis structure shown at 3, which latter is held in position upon the supporting axle 4. I provide a layer of felt 5 in such shape that it will lie adjacent the side edges of these various leaves, it being understood that by the term "felt" I mean felt or its equivalent, the equivalency residing in its absorbent nature for absorbing and retaining a quantity of lubricating oil. As stated, these layers of felt are placed adjacent the side edges of the spring and may be continued over the top and bottom faces if desired. This felt structure is held in position by a protector covering formed of a plurality of plate members 6 so shaped as to form an inclosure by means of their top faces 7 and two side faces 8. The free edges are then turned inwardly and by preference are made to lie adjacent the underside of the spring as shown at 9, these inwardly turned portions being provided with studs 10 to serve as a means for holding the protector structure as a whole in its applied position. This means I have shown in the form of a lacing cord 11, one end of which is rigidly attached to the stud on the extreme rear plate member and the remainder of which is laced about the remaining studs in the manner shown. The top face 7 of each of the plate members is preferably cut out to form a lip 12 of such length to overlap the succeeding plate member as is shown. The side edges of each member is also rounded to such shape that when the members are all pivotally connected together, the protector covering may flex with the same ease of movement as the spring flexes. These pivot connections for the various plate members, I preferably make in the nature of a shock absorber structure to prevent the rapid rebound of the spring after it has once been suddenly flexed in the opposite direction. These pivot connections comprise pivot pins 13 which may either be in the form of rivets or bolts, as may be desired, it being necessary only that they be of such form that they securely hold resilient washers 14 in their correct positions. Between the side faces of adjacent members or those sides which are pivotally connected together, I interpose a layer of leather 15 or some similar material which will produce friction by movement of the members. The degree with which the side faces 8 of these plate members bear against the leather washers may be regulated when the device is initially applied or they may be regulated whenever desired in case bolts are resorted to to form the pivot pins. Thus, it will appear that I have provided a type of protecting member which itself closely follows the contour of the spring to which it is applied and at the same time does not render the same unsightly to the least degree. Further, by locating the holding means or the lacing cord 11 on the underside of the spring, the top side presents a smooth surface to which dust and dirt will not readily adhere. By means of the peculiar type of pivot connection between the various plate members, I have combined with my lubricating device a shock absorber structure designed to prevent the excessive or to rapid rebound of the spring after it has once been flexed. This shock absorber structure acts on the friction principle, in that the sides of adjacent plate members are formed to be in rubbing engagement with the leather washer when the spring is flexed.

What I claim, is:

1. In combination with a leaf spring, a layer of felt or the like mounted in coöperative relation with the leaves of said spring, and a protector covering for said felt formed of a plurality of plate members each bent to have a top and two side faces to form an inclosure and the various members pivoted together.

2. In combination with a leaf spring, a layer of felt or the like mounted in coöperative relation with the leaves of said spring, a protector covering for said felt formed of a plurality of plate members pivotally connected and bent to have a top and two side faces with the edge portions bent inwardly to form the bottom, studs on said inwardly bent portions, and lacing means for drawing the sides of said members together.

3. In combination with a leaf spring, a layer of felt or the like mounted in coöperative relation with the leaves of said spring, a protector covering for said felt formed of a plurality of plate members, and friction shock absorber pivot connections between said plate sections.

4. The combination with a leaf spring, a layer of felt or the like mounted in coöperative relation with the leaves of said spring, means for holding said felt in applied position and a shock absorber structure carried by said means and actuated when said spring is flexed.

5. In combination with a leaf spring, a layer of felt or the like mounted in coöperative relation with the leaves of said spring, a protector covering for said felt formed of a plurality of plate members bent to form an inclosure and pivoted together, the pivot connections being arranged to form shock absorber structures, and means for holding said covering in its applied position.

6. In combination with a leaf spring, a layer of felt or the like mounted in coöperative relation with the leaves of said spring, a protector covering for said felt formed of a plurality of plate members bent to form an inclosure, and pivoted together, said pivot connections being formed of pivot bolts, a resilient washer, and a layer of leather or the like interposed between the sides of adjacent plate members, and means for holding said covering in its applied position.

In testimony whereof I affix my signature in presence of two witnesses.

THEODORE LINDENBERG.

Witnesses:
A. L. PHELPS,
C. C. SHEPHERD.